UNITED STATES PATENT OFFICE 2,106,446

REMOVAL OF GASEOUS WEAK ACIDS FROM GASES CONTAINING THE SAME

Hans Baehr and Wilhelm Wenzel, Leuna, Germany, assignors to I. G. Farbenindustrie Aktiengesellschaft, Frankfort-on-the-Main, Germany No Drawing. Application January 26, 1935, Serial No. 3,676. In Germany February 1, 1934

8 Claims. (Cl. 23—2)

The present invention relates to the removal of gaseous weak acids from gases containing the same.

It has already been proposed to remove gaseous weak acids from gases by washing them with organic bases which are then regenerated by heating, the weak acids thereby being expelled. Hitherto triethanol amine and other simple ethanol amines have mainly been employed as organic bases. They do not satisfy the requirements of practice, however, because they have either too high a volatility or too low a washing effect. Thus for example monoethanol amine has a good washing effect but its volatility is too great. In order to reduce the latter it has been proposed to add boric acid to the bases. The basicity and the washing effect of the bases is, however, simultaneously lowered by such addition. It has also been proposed to employ, instead of ethanol amines, bases which contain several amino groups and also for example a hydroxyl group in the molecule, such as 1.3-diaminoisopropanol. The compounds of this kind hitherto employed have the disadvantage, however, that they resinify comparatively readily and tend to form cyclic compounds in the presence of water. These cyclic compounds have the same absorptive capacity as the original substances but are much more volatile so that their formation gradually leads to serious losses of valuable bases.

This invention has for its object to obviate the said disadvantages and to combine a high washing effect with a low volatility.

It has been found that gaseous weak acids can be advantageously removed from gases by washing the gases with such bases, or solutions thereof, as contain at least two atoms of nitrogen in the molecule and correspond to the general formula:—

in which B is an aliphatic hydrocarbon radicle which may also contain a simple or substituted amino group, at least one of the groups A is an alkyl or aryl group (which may contain a hydroxyl group or a substituted amino group), while the remaining groups A are hydrogen or alkyl or aryl groups.

By suitable selection of the groups A, the solubility of the bases may be influenced in any desired way. Thus for example the introduction of alkyl groups usually reduces the solubility in water but increases the solubility in oil and other hydrophobic substances. The presence of alkylol groups usually has the opposite effect. This possibility of influencing the solubility is of great importance when the base solution comes into contact with a liquid not miscible therewith and it is desired that the latter should not dissolve out any of the base.

The selection of the groups A is also of importance as regards the basicity. It is possible to decrease or increase the basic character of the compounds in a systematic manner by varying the groups A. For example the introduction of an alkyl group in the place of a hydrogen atom attached to a nitrogen atom weakens the basicity more than that of an alkylol group. Aromatic groups decrease the basic character still more. Comparatively weak bases of the said kind may be employed when it is desirable to remove a somewhat stronger gaseous acid by itself from the gas but to leave weaker gaseous acids therein. For example sulphur dioxide, which in aqueous solution is more strongly dissociated than carbon dioxide, may be washed out in the presence of the latter without the base being consumed for the absorption of the carbon dioxide. For the said purpose the base must be so weak that it will absorb the sulphur dioxide, but not the carbon dioxide, the sulphur dioxide being expelled again by heating.

The number of bases capable of being employed according to this invention is very large. For the preparation of the same it is advantageous to start from readily accessible unsaturated hydrocarbons, such as ethylene, propylene or acetylene, or from chlorinated hydrocarbons or alcohols. The substitution products of ethylene diamine, diethylene triamine and triethylene tetramine and their higher homologues, and also the corresponding derivatives of triaminopropylene, triaminobutylene and tetraaminobutylene, are especially suitable.

The compounds having the following formulae may be employed for example:—

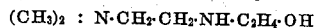
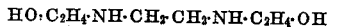

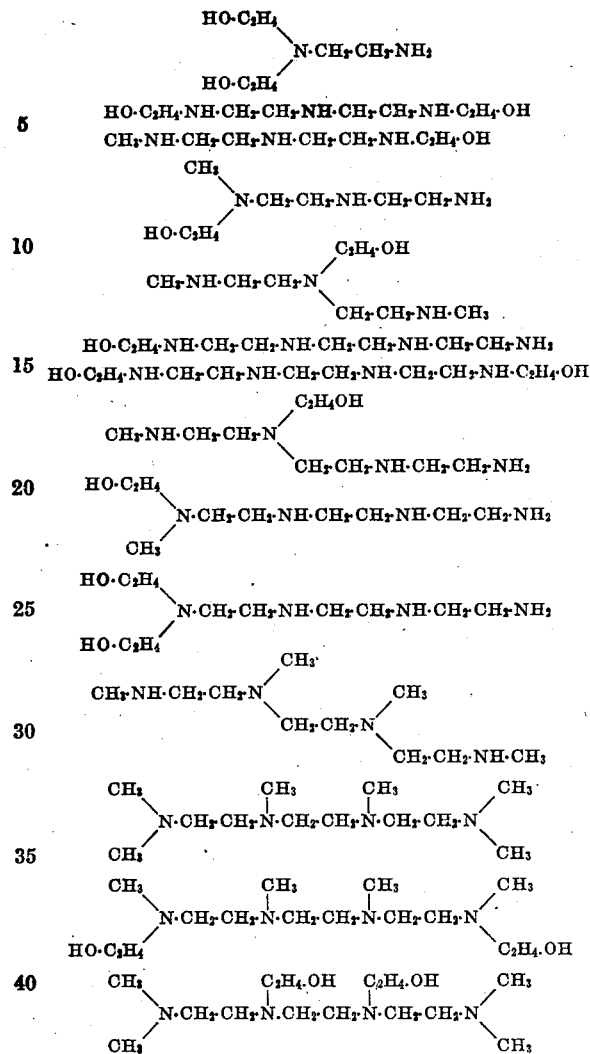

The corresponding compounds containing an aryl group, as for example the benzyl, naphthyl or pyridyl group, may also be used.

Many of the bases to be employed are liquids and may be used directly as such. The salt of the absorbed weak acid and the base usually separates in a solid form. The process may be continued until the whole becomes solid and gas will no longer pass through. The separation of a solid salt, however, offers the possibility of a simple regeneration of the base by continuously or discontinuously removing the separated salt, recovering the free base therefrom by heating and returning it to the part used for the washing of the gas at the same rate as the salt is removed. This kind of regeneration is especially simple when the salt is precipitated in a readily separable form. By suitable movement of the base, as for example by stirring in the sump of a washing tower or by the addition of a diluent favouring the deposition of a granular precipitate, the formation of the precipitate may be influenced in the desired way.

If it is desired to avoid the precipitation of a solid salt or to render such precipitation difficult or to wash large amounts of gas containing but little acid, it is preferable to employ the base in a dissolved or diluted condition. Depending on the purpose for which it is to be employed, a suitable diluent may be selected. Solutions in water have the advantage that the basic character is empasized most strongly by reason of the best possibilities for ionization; consequently the bases attain their highest absorptive capacity in water.

Sometimes the choice of another diluent may be of advantage, as for example when the aqueous solution has strongly corrosive properties or when the gas to be washed has also to be washed with another liquid medium, as for example with cresol or washing oil. This is the case for example with coke oven gases which are washed with one of the said liquids for the removal of benzene. If the bases according to this invention are added to the said liquids, a simultaneous washing out of the weak acids is effected in one operation while employing the same apparatus. The expelling of the benzene may also be effected in the manner hitherto usual. Then, again in a single operation, the regeneration of the base by the expelling of the volatile acids takes place. In the said manner it is possible without any additional expenditure of energy or work to free coke oven gas from hydrogen sulphide as well as from benzene; the said substances are then available in a concentrated form for further use.

When washing gases with diluted bases, the degree of dilution depends mainly on the nature and amount of the gas to be washed and the absorptive capacity of the base. The concentration may vary within wide limits. High concentrations of the bases in water are advantageous for the purpose of economy of heat because concentrated aqueous solutions have a smaller specific heat than dilute aqueous solutions and therefore the heating and regeneration are cheaper. If it is desired to carry out other processes at the same time as the washing out of the weak acids, as for example a cooling of the gases or the simultaneous washing out of other substances, the concentration of base is preferably so adjusted that in addition to the removal of the weak acids the other process is effected to the desired extent. For example, if benzene is to be washed out at the same time, so much base is added to the washing oil that its absorptive capacity for hydrogen sulphide is exhausted at the same time as the washing power of the oil for benzene.

The washing of the gases may be carried out at ordinary, elevated or lowered temperature. In some cases working at elevated temperatures offers advantages. Thus for example carbon dioxide may be washed out considerably more rapidly at elevated temperature (as for example up to about 70° C.) than at room temperature because its speed of hydration increases with increasing temperature. From the point of view of heat economy, working at elevated temperatures is of advantage because the washing agent need not be cooled after the expelling. The gases may be washed under any desired pressure. Gases which are already under pressure are advantageously washed under the said pressure; the speed of purification also increases with increasing pressure. In some cases it may be advantageous to compress a gas which is at low pressure, as for example at atmospheric pressure, for the purposes of washing, but generally speaking it is most economical to carry out the washing under the prevailing pressure.

The regeneration of the washing liquid by heating may be effected in any desired manner, as for example by direct or indirect heating with steam, direct fire, hot gases, as for example combustion gases, hot vapours, as for example benzene or chlorinated hydrocarbons, or other hot media. In order to conserve heat the solution to be heated is preferably preheated in a heat exchanger by the hot liquid which has already been regenerated. The expelling of the weak acids may be carried out in any apparatus suitable for the purpose, such as towers or expelling columns. The regeneration of the solutions is promoted by a rapid withdrawal of the disengaged gases, such as is the case for example in a trickle tower in which a pure gas or vapour is led upwards in counter-current to the solution which is trickling down. Even though the volatility of the said bases is very low as compared with that of the bases hitherto proposed, it is still advantageous to take precautions against loss of bases. Especially during the expelling process care should be taken that nothing is carried away mechanically from the base solution. When direct steam serves for the regeneration of the bases, the waste steam may be condensed and any volatilized bases recovered from the condensate.

The following examples will further illustrate how this invention may be carried out in practice but the invention is not restricted to these examples.

Example 1

A current of gas containing 10 grams of hydrogen sulphide per cubic meter and 5.6 per cent of carbon dioxide is washed with a 10 per cent solution of dihydroxyethylethylenediamine in washing oil. With a ratio by volume between solution and gas of 1:570, the gas is freed to a remainder of 1 per cent of carbon dioxide and practically quantitatively from hydrogen sulphide. The exhausted washing solution is continuously regenerated by heating and returned to the washing process after cooling.

Example 2

A washing oil (a mineral coal tar oil fraction boiling at from 200° to 300° C.) serving for washing out benzene has added thereto 10 per cent of monohydroxymethyl-diethylenetriamine and the solution is employed for washing coke oven gas. The gas coming from the sulphuric acid washer contains 10 grams of hydrogen sulphide, 1 gram of hydrocyanic acid and 0.8 gram of benzene per cubic meter and passes through a washing tower through which trickles the mixture of washing oil and base in the ratio of 1 liter of liquid to 1 cubic meter of gas. 20 cubic meters of gas are led per hour through a washing tower of 2 cubic meters content. The gas after the washing is practically completely free from hydrogen sulphide and hydrocyanic acid while the benzene is washed out at the same time. The mixture of washing oil and base is treated with steam in an expelling apparatus of the usual type. The hydrogen sulphide in the escaping gas is burned to form sulphur dioxide which is worked up in known manner to sulphuric acid. The waste steam is condensed and the water separated from the benzene. The mixture of washing oil and base is returned to the process after cooling.

Example 3

A gas containing 20 grams of hydrogen sulphide per cubic meter is washed in a washing tower with a 20 per cent aqueous solution of monomethyl - monohydroxyethyl - triethylenetetramine. By keeping the ratio by volume of liquid to gas at 1:1000 and by trickling a tower of 0.9 cubic meter content with 600 liters of solution of base per hour, the hydrogen sulphide is practically completely removed. The base is regenerated as described in Example 1. The hydrogen sulphide obtained is burned to form sulphur dioxide and worked up in the known manner with ammonia to form ammonium sulphate.

What we claim is:

1. The process of removing a gaseous weak acid from a gas containing the same which comprises scrubbing said gas with a washing liquid comprising a base containing at least two atoms of nitrogen and corresponding to the general formula

in which B is selected from the group consisting of the aliphatic hydrocarbon radicles and those derivatives thereof which contain an amino group, and in which at least one of the groups A is a hydroxy alkyl group, while the remaining groups A are selected from the class consisting of hydrogen, the alkyl and hydroxy alkyl groups.

2. The process of removing a gaseous weak acid from a gas containing the same which comprises scrubbing said gas with a washing liquid comprising a base containing at least two atoms of nitrogen and corresponding to the general formula

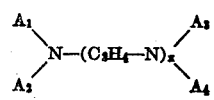

in which $x$ is a whole number, and in which at least one of the groups A is a hydroxy alkyl group, while the remaining groups A are selected from the class consisting of hydrogen, the alkyl and hydroxy alkyl groups.

3. The process of removing a gaseous weak acid from a gas containing the same which comprises scrubbing said gas with a washing liquid comprising a base containing at least two atoms of nitrogen and corresponding to the general formula

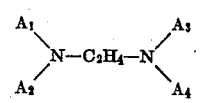

in which at least one of the groups A is a hydroxy alkyl group, while the remaining groups A are selected from the class consisting of hydrogen, the alkyl and hydroxy alkyl groups.

4. The process of removing a gaseous weak acid from a gas containing the same which comprises scrubbing said gas with a washing liquid comprising a base containing at least two atoms of nitrogen and corresponding to the general formula

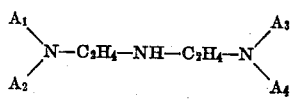

in which at least one of the groups A is a hydroxy alkyl group, while the remaining groups A are selected from the class consisting of hydrogen, the alkyl and hydroxy alkyl groups.

5. The process of removing a gaseous weak acid from a gas containing the same which comprises scrubbing said gas with a washing liquid comprising a base containing at least two atoms of nitrogen and corresponding to the general formula

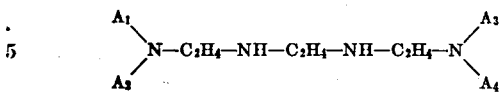

in which at least one of the groups A is a hydroxy alkyl group, while the remaining groups A are selected from the class consisting of hydrogen, the alkyl and hydroxy alkyl groups.

6. The process of removing a gaseous weak acid from a gas containing the same which comprises scrubbing said gas with a washing liquid comprising dihydroxyethyl-ethylene-diamine.

7. The process of removing a gaseous weak acid from a gas containing the same which comprises scrubbing said gas with a washing liquid comprising monohydroxymethyl-diethylene-triamine.

8. The process of removing a gaseous weak acid from a gas containing the same which comprises scrubbing said gas with a washing liquid comprising monomethyl-monohydroxyethyl-triethylenetetramine.

HANS BAEHR.
WILHELM WENZEL.